United States Patent [19]
Sakai

[11] 3,802,037
[45] Apr. 9, 1974

[54] METHOD OF MANUFACTURING BULKY YARNS

[75] Inventor: Sadami Sakai, Fukui, Japan

[73] Assignee: Todoroki Sangyo Kabushiki Kaisha, Fukui-shi, Fukui-ken, Japan

[22] Filed: Oct. 28, 1971

[21] Appl. No.: 193,425

[52] U.S. Cl. .................................... 28/72.1, 28/1.2
[51] Int. Cl. .............................................. D02g 1/00
[58] Field of Search ......... 28/1.2, 62, 72.1; 19/65 T; 51/7, 20, DIG. 10, 72

[56] References Cited

UNITED STATES PATENTS

| | | | |
|---|---|---|---|
| 1,957,508 | 5/1934 | Taylor | 51/7 |
| 3,375,559 | 4/1968 | Moyer et al. | 19/65 T UX |
| 3,613,403 | 10/1971 | Peel | 28/62 UX |
| 3,650,001 | 3/1972 | Nikkel | 28/1.6 |

FOREIGN PATENTS OR APPLICATIONS

| | | | |
|---|---|---|---|
| 4/6/25,549 | 7/1971 | Japan | 28/72.1 |
| 1,119,838 | 7/1968 | Great Britain | 28/1.2 |
| 264,400 | 6/1964 | Netherlands | 28/62 |

*Primary Examiner*—Robert R. Mackey
*Attorney, Agent, or Firm*—Toren and McGeady

[57] ABSTRACT

A method of manufacturing bulky yarns comprising feeding a yarn through a texturing zone wherein the yarn is contacted by a non-continuous solid layer of heated granular matter in a dispersion generated by forced vibration thereof.

1 Claim, 1 Drawing Figure

3
5
7
2
8
6
4
9
1
VIBRATOR

PATENTED APR 9 1974 3,802,037
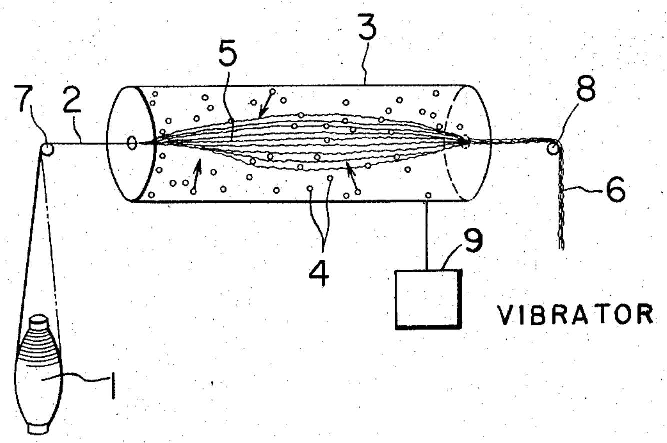
INVENTOR
SADAMI SAKAI
BY Toren and McGeady
ATTORNEYS

METHOD OF MANUFACTURING BULKY YARNS

Demand for bulky yarns has been remarkably increased recently. So-called synthetic fiber textured yarns are also called synthetic fiber worked (processed) yarns. Among the methods for manufacturing the textured yarns (hereinafter called worked yarns), are twist-setting-untwist method, falsetwist method, stuffer box method, shocking and vibration method, high pressure air jet method, etc.

The inventor has succeeded in making synthetic fibers into a bulky form by using a jet layer of non-continuous solid matter, and after studying and noting that such method of manufacturing bulky yarns has a higher efficiency than the conventional methods, an application for Japanese Patent (Patent Application, Toku-gan Sho 42-36872) was filed now Japanese Patent Publication No. Sho 46-25549.

Further, as a result of continued detailed studies, the inventor has discovered a new method, described later herein, which affords improved efficiency.

In a conventional method for heating synthetic fibers in manufacturing synthetic fiber worked yarns, the fiber is plasticized in heated air beforehand (the heating is carried out close to the melting point of the fiber), then the above-mentioned twist-setting-untwist method or falsetwist method is applied and the speed for manufacturing the worked yarns depends on the time required to render the synthetic fiber into plasticized form, that is, the time required to effect the final change in the form of the fiber in accordance with the method employed. With regard to the time for heating and inducing plasticity, when the heat capacity and the speed for the transmission of heat from the heating medium to the synthetic fiber are high, the speed for manufacturing worked yarns can be increased. Based on this characteristic, the present inventor has achieved a remarkable increase in the manufacturing speed of textured yarn by providing mechanical shock and heat conduction through heating and injecting metallic granular matter and glass granular matter, used as the heating medium which has a higher thermal conductivity than that of heated air. An application (Japanese Patent Application Sho 43-40397) was filed on this concept and has issued as Japanese Patent No. 635,161.

Now, the present inventor has discovered a new method to take the place of the method for changing the form of the fiber by the shock of heated granular matter with the above-mentioned high pressure air jet method in which the synthetic fiber is passed through a non-continuous solid heating layer of granular matter in a dispersed state, and, by electro-magnetic means or mechanical vibration of the granular matter, providing improved thermal conductivity as compared to that in the high pressure air jet method so that the worked yarns can be produced with extremely high speed.

The present invention will be described by referring to the attached drawing showing one embodiment of the present invention.

The single FIGURE shows the principle of the device for making synthetic fibers into bulky form by a non-continuous solid heating layer according to the present invention.

First, granular matter 4 (glass type ceramics, metallic granular matter) which has been heated beforehand is placed in a heating cylinder 3, which in turn is subjected via a vibrator 9 to strong vibration, either electro-magnetically or mechanically, to induce the dispersing shock power of the granular matter 4. Then, regular yarn 2 which has been removed from a pirn 1 of fiber (organic or non-organic fiber) and directed over a guide roll 7, passes through the heating cylinder 3 and is pulled out over a guide roll 8. Each filament composing the regular yarn is heated by thermal conductance to a condition of thermal plasticity in the non-continuous layer of heated glass type ceramics or metallic granular matter, and at the same time each filament is untwisted and opened by static electricity generated in the high temperature friction developed by the strong impact force caused by the forced vibration of the granular matter in the dispersed state. Simultaneously, complicated bending of the filaments takes place and results in the forming of an aggregate 6 of curled filaments of a bulky yarn.

What is claimed is:

1. Method of manufacturing a bulky yarn comprising the steps of arranging a heating cylinder for forming a closed space, filling the closed space with a non-continuous solid layer of heated granular material so that the granular material is contained within the closed space, vibrating the heating cylinder for effecting a forced vibration of the granular material within the closed space for placing the granular material in a dispersion, passing a yarn formed of synthetic fibers through the dispersion of the vibrating heated granular material for heating the yarn to a condition of thermal plasticity and applying static electricity generated in the high temperature friction developed by the strong impact force resulting from the interaction of the yarn and the dispersion for untwisting and opening each filament of the yarn and forming curled filaments of a bulky yarn.

* * * * *